(No Model.)
S. B. IRWIN.
ROAD CART.
No. 479,944. Patented Aug. 2, 1892.
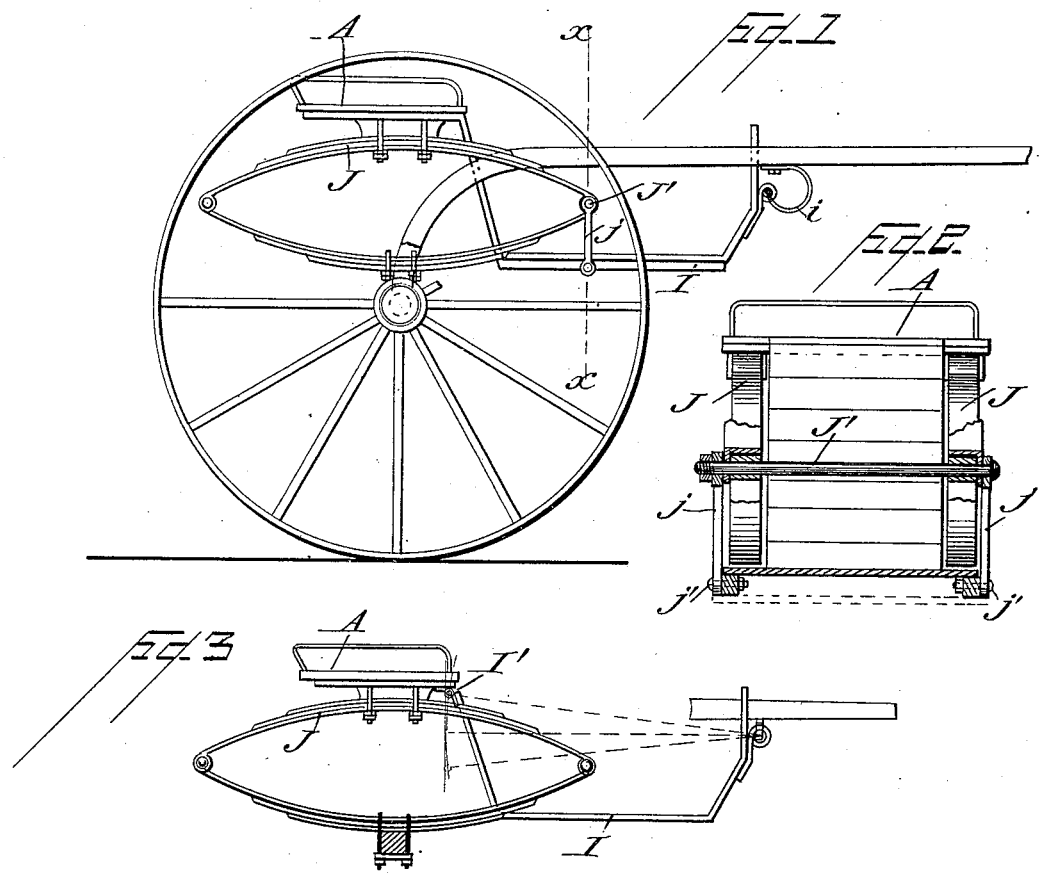
Attest:
F. H. Schott
Wm L. Boyden.
Inventor
Samuel B. Irwin
per John C. Parker,
Atty.

UNITED STATES PATENT OFFICE.

SAMUEL B. IRWIN, OF WEST HEBRON, NEW YORK.

ROAD-CART.

SPECIFICATION forming part of Letters Patent No. 479,944, dated August 2, 1892.

Application filed March 30, 1891. Serial No. 386,982. (No model.)

*To all whom it may concern:*

Be it known that I, SAMUEL B. IRWIN, a citizen of the United States, residing at West Hebron, in the county of Washington and State of New York, have invented certain new and useful Improvements in Road-Carts; and I do hereby declare the following to be a full, clear, and exact description of the invention, such as will enable others skilled in the art to which it appertains to make and use the same.

My present invention relates to an improvement in road-carts or similar vehicles, the object of the invention being to complete and perfect the construction of various parts of the road-cart or other vehicle, so that an improved vehicle subserving many useful advantages in practical use may be provided; and the invention consists in the construction, arrangement, and combination of the several parts, substantially as will be hereinafter described and claimed.

In the annexed drawings, illustrating my invention, Figure 1 is a side elevation of my improved vehicle, showing the link connection between the anterior ends of the springs and the vehicle-body. Fig. 2 is a sectional elevation on the line $x\ x$ of Fig. 1. Fig. 3 is a detail side elevation of my improved vehicle, showing the hinged connection between the vehicle-seat and the body.

Similar letters and numerals of reference designate corresponding parts throughout all the different figures of the drawings.

I will now proceed to describe a feature of my improved road-cart, which consists, essentially, in the connection of the anterior ends of the springs with the body, so as to prevent unpleasant motion in the vehicle.

If I refer to Fig. 1, I will see the seat-frame A mounted upon a pair of elliptical springs J J, placed transversely upon the axle, as shown in Fig. 2.

I designates the vehicle-body with which the seat-frame A is connected, said vehicle-body I being connected with the cross-bar or some other corresponding part of the thills by springs *i*, which are very yielding, said springs *i* being of any suitable and desirable form. It will be understood that these springs *i* must be so very sensitive that they will offer almost no resistance to the action of the anterior portion of the vehicle-body for a limited space. If they are not thus exceedingly yielding they will communicate the thill action, which is denominated "horse motion," to the anterior part of the body. It will also be observed that in order to have the vehicle properly balanced it is necessary to mount the seat upon the springs, so that its greater portion will be posterior to their middle line. If the seat should be mounted evenly, the center of gravity would fall in front of the axle and the weight would come upon the anterior springs, and these would have to be strong and in a measure unyielding; but this would defeat the object for which they are used—namely, the prevention of the communication of the thill motion to the vehicle-body. If the seat changes its level on account of unequal action of the springs, there must be a corresponding change in the front portion of the body and if there is a vertical action of the front part of the body there must be a horizontal action of the seat, as will be evident from an inspection of the movement of the parts as delineated in Fig. 1; also, on account of the body having only yielding spring connections with the rest of the vehicle its anterior part has a lateral or back-and-forth motion between the thills, which lateral motion may amount to an inch, or even more, provided the anterior springs admit of it. The defects, therefore, of a cart which has the body supported posteriorly by elliptical springs placed crosswise upon the axle and connected anteriorly to the cross-bar or corresponding parts of the thills by very sensitive springs, as is illustrated in Fig. 1, are that it has a horizontal motion of the seat which is the exact equivalent of a horse motion. It has an overaction of the front part of the body, which dances the feet up and down very unpleasantly, and the foot-box has a lateral or springing motion between the thills. I aim to do away with these defects, and I accomplish their elimination in the following manner:

I provide a horizontal bar J', which may be of any suitable size, and this bar is passed through eyes or bearings in the anterior ends of the elliptical springs J J, as shown in Fig. 1. To the opposite ends of the rod J' are pivotally connected the short links or connections

*j j*, the lower ends of which are pivotally connected by means of bolts or pins *j' j'* to the bottom edges of the vehicle-body I. I thus have a pivotal connection between the anterior ends of the elliptical springs and the vehicle-body. By this means the over action of the front part of the body is prevented, and also the horizontal motion of the seat is obviated and an even vertical descent of the whole body is secured. Practical experiment fully demonstrates this. It will be of course evident that the body being fastened to the points of the springs cannot, on account of unequal action of these springs, rise without retaining to them a definite and fixed relationship, and if the front of the body cannot rise the seat and spring-bars cannot change their level, and if the seat and spring-bars cannot change their level the springs cannot yield posteriorly more than they do at the corresponding part anteriorly.

The mode of pivotally connecting the anterior points of the springs with the vehicle-body may vary greatly, and I reserve the liberty of making this pivotal connection in any way I think fit. It might be thought that if the vertical action of the body is limited to that of the points of the springs there would not be enough spring action to make the riding easy; but it is to be remembered that the springs are yielding bodies, which readily admit of a good deal of accommodation. Hence this limitation upon their movement is not exact, and as they have their posterior extremities entirely free and their anterior extremities connected by a pivotal joint with the body their action does not seem to be limited to any perceptible degree. Any desired amount of spring action can be readily obtained by simply lengthening the springs; but those of ordinary length give entirely satisfactory results. Of course I do not intend to restrict this feature to road-carts or vehicles of the peculiar pattern delineated in Figs. 1, 2, and 3; but I deem my invention broad enough to cover the pivotal connection of transverse elliptical springs with any kind of a wagon-body arranged in any manner.

I will now proceed to describe another feature of my improved road-cart or vehicle. I refer now to Fig. 3. It is evident that when the seat A rises and falls on account of the action of the supporting-springs J J the back of seat A must move in the arc of a circle, for the pivotal point at the front end of the wagon-body at the springs *i* is the center upon which the whole body turns. It is also evident that the body, although angular in form, has the same action as the straight radius 1 2. When the seat descends, it also moves backward, and when it rises it moves forward. The perpendicular lines 3 4 show the movement of the seat's variation from vertical action. If a high or lazy back should be placed upon the seat, this variation would be greater still, for the back would move in a higher arc of a circle, slightly larger, but having the same center at *i*. Now this motion which the mechanical action of the body produces is synchronous with the thill motion and exactly resembles it, for they are both, as far as the seat is concerned, a back-and-forth motion. Hence in proportion to its movement this motion adds to the thill motion and intensifies it. In many carts which have devices more or less useful to lessen the thill motion this other motion constitutes the chief or most serious defect. If the cart-body could be supported anteriorly and posteriorly by springs so finely balanced in their action that vertical descent of the whole body could be secured, then this defect would be obviated; but as the weight carried does not fall evenly upon the springs any change in the weight would throw them out of place, and so would any change in the level or grade of the road. If the posterior springs should have the greater action, then the radius action of the body already described will obtain. If the anterior springs should act more freely, then a horizontal action would affect the seat. To obviate these several defects constitutes one of the important features of the present invention, and therefore to overcome said defects, which are commonly found existing in a cart which has the front part of the body connected to the cross-bar or some corresponding part of the thills, either by a pivotal joint or springs of any given form, I have constructed a cart-body consisting of two parts connected together by pivotal joints on either side, said joints being simply hinges, as I', (shown in Fig. 3,) or any other suitable pivotal connection. These joints or pivotal points are located just under the front edge of the seat in the preferable form of the wagon; but their situation can be varied by simply lengthening either of the connecting-irons or changing the place of their attachment. The best position for the pivotal point is directly over the axle and about two inches above the level of the anterior connecting spring or joint. If there is a box beneath the seat, these joints should be placed beneath it. When the body consists of two parts joined together by pivotal joints or hinges I' I', as described, it is evident that the radial action of the front part of the body must terminate at this joint, and therefore the seat will be free from much of the unpleasant motion otherwise imposed upon it. If the seat A descends, it must obviously carry the joints I' down before it, and as the front part of the body acts as the radius of a circle, having the spring *i* at its center, the joints I' I' must in descending describe the arc of a circle; but on account of the relationship of the joints I' and the spring *i* in point of level the joints I' will have practically a vertical descent, as shown by the diagrammatic lines in Fig. 3. The joints I' move downward and very little backward until they reach the level of the spring *i*. Then they move downward and very little forward until they reach the lower level. (Indicated by the lower dotted lines in Fig. 3.) By this arrangement it will be noted that the divergence from the vertical line is halved, and when it is considered that the practical circle has a diameter of over four feet it needs no further demonstration to show that this deviation from the vertical line is so very little as to be wholly inappreciable to a person occupying the seat.

Having thus described my invention, what I claim as new, and desire to secure by Letters Patent, is—

1. In a road-cart or other vehicle, the combination of the body I, the seat A, consisting of a flat horizontal surface, the vehicle-axle, transverse elliptical springs J J, supported on said axle and sustaining thereon the seat, the hinges or joints I', connecting the seat with the aforesaid body at a point near the front edge of the seat-surface and directly beneath said edge, and the springs $i$, which connect the forward end of the vehicle-body with the cross-bar of some other corresponding part of the thills, substantially as described.

2. In a road-cart or other vehicle, the combination of seat A, vehicle-body I, transverse elliptical springs J J, supported on said axle and sustaining thereon the seat, the pivoted links or connections $j j$, which connect the forward ends of the elliptical springs with the bottom edge of the body A, the hinges or joints I', connecting the seat directly with the body at a point near the front edge of the seat-surface and directly beneath said edge, and the yielding springs which connect the forward end of the body I with the cross-bar or some other corresponding part of the thills, substantially as described.

In testimony whereof I affix my signature in presence of two witnesses.

SAMUEL B. IRWIN.

Witnesses:
CHARLES S. HANNA,
WILLIAM S. HANNA.